March 14, 1961  P. E. BESSIERE  2,974,657
FUEL INJECTION DEVICE FOR A MULTICYLINDER
INTERNAL COMBUSTION ENGINE
Filed Dec. 1, 1959  2 Sheets-Sheet 1
*Fig.1.*
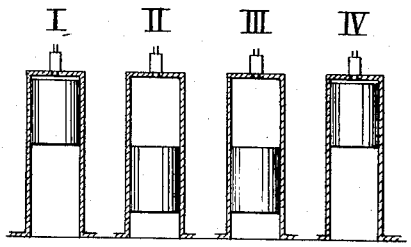
*Fig.2.*  *Fig.4.*
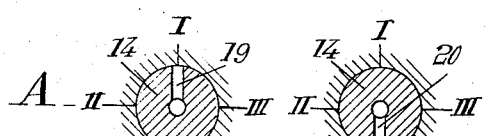
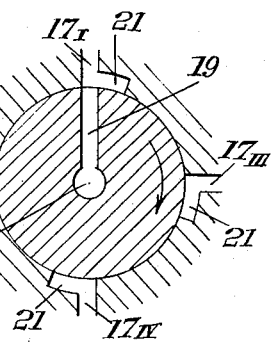
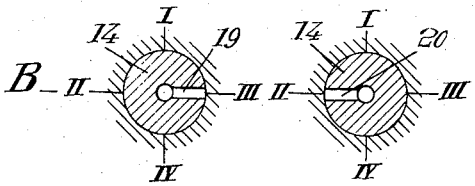
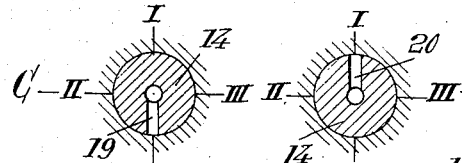
*Fig.5.*
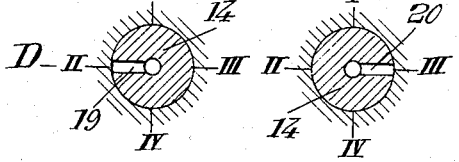
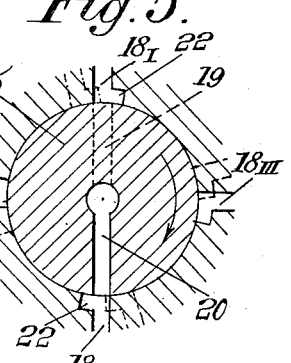
INVENTOR
PIERRE ETIENNE BESSIERE
BY
Bailey, Stephens & Huettig
ATTORNEYS

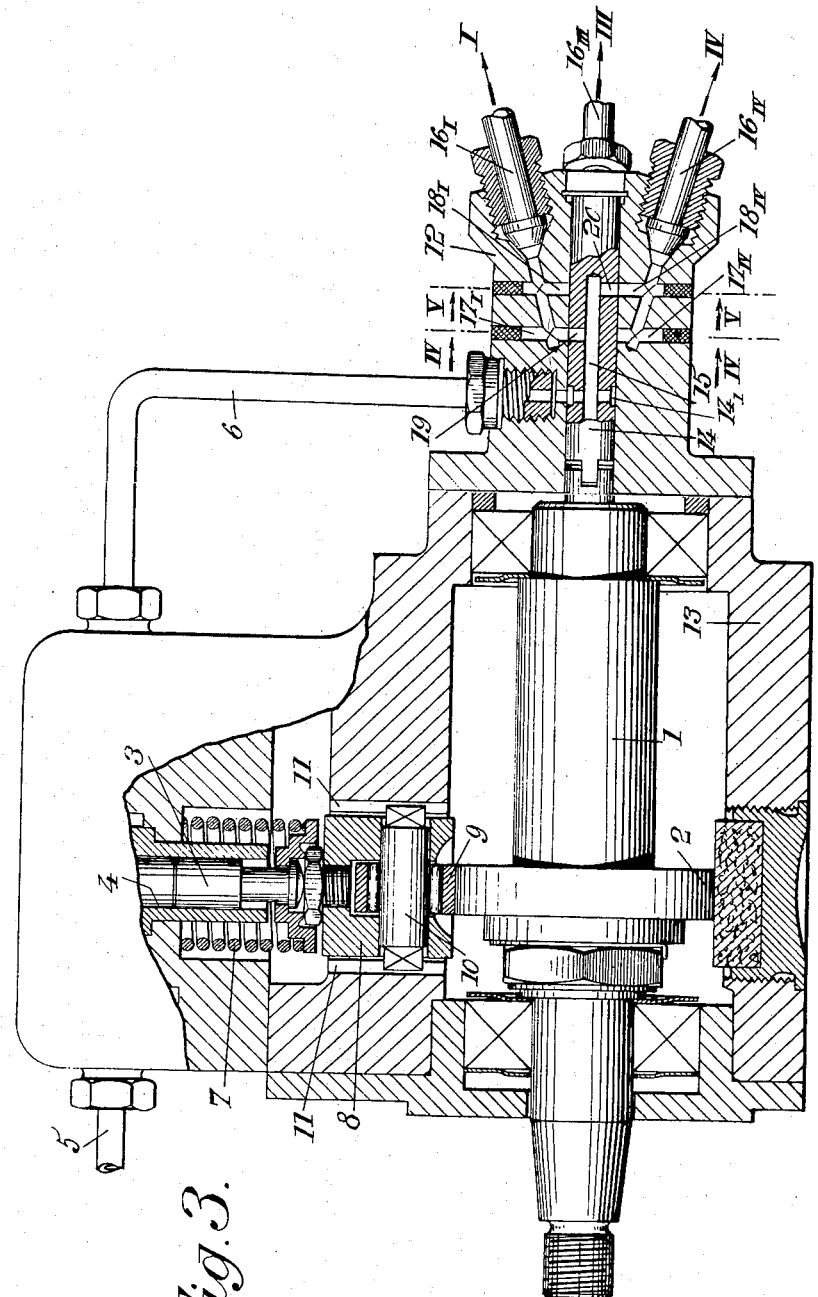

United States Patent Office 2,974,657
Patented Mar. 14, 1961

2,974,657
FUEL INJECTION DEVICE FOR A MULTICYLINDER INTERNAL COMBUSTION ENGINE
Pierre Etienne Bessiere, 55 Blvd. Commandant Charcot, Neuilly-sur-Seine, France
Filed Dec. 1, 1959, Ser. No. 856,587
4 Claims. (Cl. 123—139)

The present invention relates to a fuel injection device for a multicylinder internal combustion engine, this injection device being of the type in which a single piston and cylinder system of a reciprocating fuel injection pump is connected through a distributing valve successively to a plurality of fuel injectors mounted on the respective cylinders of the engine.

The object of the present invention is to provide a fuel injection device of this kind for use with an internal combustion engine in which the fuel injection to every cylinder and on every cycle is divided into two portions, to wit a substantial amount which is pre-injected, preferably before the exhaust valve of the corresponding cylinder is closed, this amount constituting for instance 40% of the whole of the fuel to be injected, and a main amount which is injected just before ignition takes place in said cylinder.

For this purpose, according to the present invention, a distributing valve connects the delivery of the injection pump, during every delivery stroke thereof, simultaneously, to the respective fuel injectors mounted on two different cylinders of the engine in such manner that, when this double injection is performed, ignition is about to take place in one of said two cylinders, whereas the exhaust of the other of said cylinder is just going to be closed or has just been closed, means being further provided for causing the amount of fuel that is pre-injected to constitute a substantial portion, for instance approximately 40%, of the total amount of fuel to be injected into this cylinder during every stroke of the engine.

The engine on which the fuel injection device according to the invention is to be fitted may be either a diesel engine, that is to say an auto-ignition engine the fuel of which consists of oil, or a gasoline injection engine.

Preferred embodiments of the present invention will be hereinafter described with reference to the drawings, given merely by way of example and in which:

Fig. 1 diagrammatically shows the four cylinders and pistons of a fuel injection internal combustion engine such as a diesel engine.

Fig. 2 diagrammatically shows the successive positions of the rotating element of a distributing valve for use wtih the fuel injection device of such an engine, intended to effect a fuel pre-injection in advance of 180° on the main injection.

Fig. 3 is a sectional view of a single cylinder injection pump with its distributing valve arranged to provide injection and pre-injection into the four cylinders of an engine such as diagrammatically shown by Fig. 1, the whole being made according to an embodiment of the present invention.

Figs. 4 and 5 are sectional views on an enlarged scale, respectively on the lines IV—IV and V—V of Fig. 3.

In what follows, it will be supposed that the engine into which fuel is to be injected is an engine having four cylinders designated in Fig. 1 by numerals I, II, III, IV, and in which ignitions, which, in the case of diesel engines, are auto-ignitions, take place successively in the respective cylinders in the order I, III, IV, II.

It is further supposed that fuel injection into these cylinders is obtained by means of a reciprocating single cylinder pump the cam-shaft of which is driven from the internal combustion engine shaft with a speed of rotation equal to one half of that of the engine shaft when the engine is of the four-stroke type. In other words, every revolution of the pump cam-shaft takes place during the time for which two revolutions of the engine shaft take place, corresponding to a complete cycle of said engine supposed to be of the four-stroke type. The cam which actuates the piston pump comprises four lobes or projections so as to produce, during every complete revolution of the cam-shaft, four reciprocations of the pump piston, every reciprocation of said piston producing a fuel delivery.

In order to obtain successive injections of fuel in the desired order into the engine cylinders I, II, III, IV, there is inserted, between the delivery conduit of the pump and the respective fuel injectors of the engine cylinders, a distributing valve, for instance a rotating valve, such that, on every delivery stroke of the fuel injection pump, said distributing valve connects the delivery conduit of the pump cylinder with the injector or injectors to be then fed with fuel.

Fig. 3 diagrammatically shows a single cylinder pump with its distributing valve, the whole being arranged in accordance with the above conditions and serving to feed fuel to an engine of the kind diagrammatically shown by Fig. 1. This pump includes a shaft 1 carrying, fixed thereon, a cam 2 having four lobes located at regular intervals about the axis of shaft 1. This shaft 1 is driven at a speed equal to one half of that of the engine shaft. Cam 2 actuates a piston 3 which moves in a direction perpendicular to the axis of shaft 1 in a cylinder 4. This cylinder 4 receives fuel from a fuel tank (not shown) through a conduit 5 in which is inserted a transfer pump (not shown). Fuel is delivered from cylinder 4 toward the engine through a delivery conduit 6.

A spring 7 constantly urges piston 3 toward cam 2 which actuates said piston through a push-piece 8 provided with a roller 9 the axis 10 of which has its ends slidably engaged in slideways 11 provided in the pump body. Thus roller 9 is constantly guided with respect to cam 2.

Delivery conduit 6 conveys the fuel delivered by the pump during every upward stroke of the piston thereof toward a distributing valve made as follows.

This valve includes a body 12 fixed to the body 13 of the pump and a rotating member 14 located at one of the ends of shaft 1 in line therewith and driven by this shaft in synchronism therewith.

Rotating member 14 cooperates through a groove with delivery conduit 6 and connects, through a longitudinal conduit 15 and a plurality of conduits which will be hereinafter described, delivery conduit 6 with two of the four outlet conduits $16_I$, $16_{II}$, $16_{III}$, $16_{IV}$ during every period for which the piston 3 of the pump is moving upwardly (delivery stroke).

Said outlet conduits, each of which leads to one of the injectors of the four cylinders I, II, III, IV respectively, are located in two radial planes at right angles to each other.

In the construction illustrated by Fig. 3, I have provided in the valve body 12 four pairs of conduits, to wit $17_I$, $18_I$ communicating with outlet conduit $16_I$, $17_{II}$, $18_{II}$ communicating with outlet conduit $16_{II}$, $17_{III}$, $18_{III}$ communicating with outlet conduit $16_{III}$ and $17_{IV}$, $18_{IV}$ communicating with outlet conduit $16_{IV}$. In the construction illustrated by the drawings, the four conduits $17_I$, $17_{II}$, $17_{III}$, $17_{IV}$ are located in the same plane IV—IV perpendicular to the axis of the distributing valve and the four conduits $18_I$, $18_{II}$, $18_{III}$, $18_{IV}$ are located in another plane V—V parallel to the first one. In this case, it suffices to provide in rotating member 12, in said planes IV—IV and V—V, two radial conduits 19 and 20 branching off from longitudinal conduit 15 and extending approximately at 180° with respect to each other.

Of course, in order to improve liquid-tightness between the various conduits above-mentioned, conduits $17_I$, $17_{II}$, $17_{III}$, $17_{IV}$ may be disposed in several planes juxtaposed to each other and perpendicular to the axis of member 14 and conduits $18_I$, $18_{II}$, $18_{III}$, $18_{IV}$ might be similarly disposed. In this case, is will be necessary to provide as many conduits such as 20 as there are different planes for conduits $17_I$, $17_{II}$, $17_{III}$, $17_{IV}$ and $18_I$, $18_{II}$, $18_{III}$, $18_{IV}$.

Conduit 19 serves to perform main fuel injection into the respective cylinders in the above indicated order, whereas conduit 20 ensures pre-injection. The diagram showing the successive injections and pre-injections is shown by Fig. 2. It will be seen that rotating member 14, in each of its positions A, B, C, D, at 90° from one another, connects delivery conduit 6 with one of the four cylinders through conduit 19 to ensure fuel injection in said cylinder and with another cylinder through conduit 20 to ensure pre-injection into said last mentioned cylinder, these two cylinders having main injection periods separated by a time interval corresponding to a rotation of 360° of the engine shaft.

In Figs. 2 and 3, conduits 19 and 20 are at 180° to each other so that, for every cylinder of the four stroke four cylinder engine, the time interval between pre-injection and main injection corresponds to a rotation of 360° of the engine shaft. However, the angle between conduits 19 and 20 and consequently the time interval between pre-injection and main injection may, within some limits, be different from these values and in particular greater than them (pre-injection taking place with a greater advance with respect to main injection). But the main injection period and the pre-injection period which take place during the same delivery stroke of the pump must at least partly overlap each other. In other words, when these periods do not coincide with each other, it is necessary to have at least the end of one of these periods coinciding with the beginning of the other so that the fuel delivered by the pump is always injected into at least one of the cylinders where said injection and pre-injection are respectively to take place.

Also, pre-injection should take place before the closing of the exhaust valve of the cylinder into which this pre-injection is effected.

Finally, the amount of fuel that is pre-injected should be smaller than that injected during the main injection period.

For this purpose, I may use for instance an arrangement as shown in Figs. 4 and 5 (in which pre-injection takes place 180° before main injection). In this case, the outlets of conduits 17 and 18 leading toward the injectors include enlarged portions 21 and 22 of different respective circumferential lengths so that pre-injection is cut off by portion 22 while main injection is still taking place through passage 21 which is longer.

Of course, these enlarged passages might be provided in the rotating member 14, with exactly the same result.

It will be noted that this arrangement does not ensure a constant ratio of the amount of fuel that is pre-injected to the amount corresponding to the main injection when the total amount of fuel to be injected varies.

If it is desired to obtain a substantially constant ratio irrespective of variations of the load, it will be necessary to make use of conduits 19 and 20 of different cross-sections respectively. For instance, conduit 20 would be provided with a throttled portion.

This throttled portion will reduce the flow rate through conduit 20 with respect to the flow rate through conduit 19 and the amount of fuel corresponding to pre-injection will be always smaller than the amount corresponding to main injection.

Fig. 5 further shows, in dotted lines, a positioning of conduit 18 which, other things being equal, would give a pre-injection advance greater than 180°.

Of course the injected fuel might be gasoline or another light fuel.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, an internal combustion engine and a fuel pump for feeding fuel to said engine, said engine including an even number of cylinders forming at least one pair, a piston mounted to reciprocate in each of said cylinders respectively, an engine shaft operatively connected with said cylinders so that, for said pair of cylinders, ignition in one of the two cylinders thereof coincides at least approximately with exhaust from the other, said fuel pump including a single pump cylinder, a single pump piston mounted to cooperate with said pump cylinder, a pump shaft operatively connected with said engine shaft for driving said pump piston in synchronism with said engine and delivery means starting from said pump cylinder, and distributing valve means for connecting said delivery means with said engine cylinders so that, during every delivery stroke of said pump piston, said delivery means are connected simultaneously with both of the engine cylinders of said pair just before ignition is to take place in one of said two cylinders and approximately at the time of exhaust in the other, whereby a pre-injection is thus produced in the second of said two cylinders whereas the fuel injected simultaneously in the other of said two cylinders constitutes the main fuel injection.

2. In combination, an internal combustion engine and a fuel pump for feeding fuel to said engine, said engine including an even number of cylinders forming at least one pair, a piston mounted to reciprocate in each of said cylinders respectively, an engine shaft operatively connected with said cylinders so that, for said pair of cylinders, ignition in one of the two cylinders thereof coincides at least approximately with exhaust from the other, said fuel pump including a single pump cylinder, a single pump piston mounted to cooperate with said pump cylinder, a pump shaft operatively connected with said engine shaft for driving said pump piston in synchronism with said engine and a delivery conduit starting from said pump cylinder, and distributing valve means for connecting said delivery conduit with said engine cylinders so that, during every delivery stroke of said pump piston, said delivery conduit is connected simultaneously with both of the engine cylinders of said pair just before ignition is to take place in one of said two cylinders and approximately at the time of exhaust in the other, whereby a pre-injection is thus produced in the second of said two cylinders whereas the fuel injected simultaneously in the other of said two cylinders constitutes the main fuel injection, said distributing valve means being arranged so that the amount of fuel that is pre-injected is a substantial amount of the total amount of fuel corresponding to pre-injection and main injection, said distributing valve means including a body provided with a cylindrical housing, a plurality of feed conduits leading to said engine cylinders respectively, a rotating cylindrical valve fitted in said housing, means for coupling said rotating valve with said pump shaft, said body being provided with two passages extending from each of said feed conduits to the cylindrical wall of said housing, one of said passages being for pre-injection and the other for main injection, and also with a passage extending from said delivery conduit to a point of the cylindrical wall of said housing, said rotating valve being provided with passages for connecting, on every stroke of said pump piston, said delivery conduit both with the main injection passage leading to the feed conduit of one of said engine cylinders and to the pre-ignition passage leading to the feed conduit of the engine cylinder of the same pair.

3. A combination according to claim 2 in which the openings into said cylindrical wall of the two passages provided in said body for simultaneously producing pre-injection and main injection into the respective cylinders of said pair are of circumferential dimensions such that during the corresponding delivery stroke of the pump there is always at least one of said two openings in communication with said delivery conduit.

4. A combination according to claim 3 in which the openings into said cylindrical wall of the passages provided in said body for pre-injections are of smaller circumferential dimensions than the openings of the passages provided for main injections.

No references cited.